United States Patent
Jøsang et al.

(10) Patent No.: US 9,954,853 B2
(45) Date of Patent: Apr. 24, 2018

(54) NETWORK SECURITY

(71) Applicant: UNIVERSITETET I OSLO, Oslo (NO)

(72) Inventors: Audun Jøsang, Hvalstad (NO); Henning Klevjer, Bærums Verk (NO)

(73) Assignee: Universitetet I Oslo (NO)

( * ) Notice: Subject to any disclaimer, the term of this patent is extended or adjusted under 35 U.S.C. 154(b) by 0 days.

(21) Appl. No.: 14/431,227

(22) PCT Filed: Sep. 25, 2013

(86) PCT No.: PCT/EP2013/070022
§ 371 (c)(1),
(2) Date: Mar. 25, 2015

(87) PCT Pub. No.: WO2014/049027
PCT Pub. Date: Apr. 3, 2014

(65) Prior Publication Data
US 2015/0281211 A1    Oct. 1, 2015

(30) Foreign Application Priority Data
Sep. 25, 2012 (GB) .................................. 1217084.1

(51) Int. Cl.
*H04L 29/06* (2006.01)
*G06F 21/35* (2013.01)

(52) U.S. Cl.
CPC ............ *H04L 63/083* (2013.01); *G06F 21/35* (2013.01); *H04L 63/10* (2013.01); *H04L 67/42* (2013.01)

(58) Field of Classification Search
CPC ...................................................... H04L 63/083
See application file for complete search history.

(56) References Cited

U.S. PATENT DOCUMENTS 6,154,751 A * 11/2000 Ault .................. G06F 17/30893
6,460,138 B1    10/2002 Morris
(Continued)

FOREIGN PATENT DOCUMENTS

WO    2004061627 A1    7/2004
WO    2006044717 A2    4/2006
(Continued)

OTHER PUBLICATIONS

Microsoft Technet: "What is Digest Authentication": downloaded from internet, Mar. 28, 2003.
(Continued)

*Primary Examiner* — Simon Kanaan
(74) *Attorney, Agent, or Firm* — Banner & Witcoff, Ltd.

(57) ABSTRACT

There is described a method for enabling a user of a client computer to securely access a remote server via a network, which is preferably the Internet, by authenticating the user. The method comprises providing a portable apparatus to the user which may communicate with the client computer. It further involves storing on the portable apparatus user credentials required to enable the user to be authenticated at the server and performing an authentication protocol between the client and the server. The authentication protocol includes the transmission to the server of a digest based at least partially on the user credentials; and the user credentials are stored on the portable apparatus in the form of a digest.

23 Claims, 3 Drawing Sheets

(56) References Cited

U.S. PATENT DOCUMENTS

| | | |
|---|---|---|
| 6,996,718 B1 | 2/2006 | Henry et al. |
| 7,197,765 B2 | 3/2007 | Chan et al. |
| 7,907,542 B2 | 3/2011 | Smith |
| 8,087,074 B2 | 12/2011 | Popp et al. |
| 2002/0065946 A1* | 5/2002 | Narayan ............... G06F 9/548 719/315 |
| 2002/0188849 A1 | 12/2002 | Kwan |
| 2005/0204362 A1* | 9/2005 | Chatterjee .......... H04L 63/0815 719/318 |
| 2007/0043947 A1 | 2/2007 | Mizikovsky et al. |
| 2007/0150943 A1 | 6/2007 | Guo et al. |
| 2007/0169043 A1* | 7/2007 | Violleau ............... G06F 9/526 717/149 |
| 2007/0234421 A1 | 10/2007 | Ogino et al. |
| 2008/0046984 A1* | 2/2008 | Bohmer ............. H04L 63/0853 726/5 |
| 2008/0072303 A1* | 3/2008 | Syed ................. H04L 63/0807 726/10 |
| 2008/0228854 A1* | 9/2008 | Grimault ............ H04L 12/2818 709/201 |
| 2008/0276308 A1* | 11/2008 | Graser ................. G06F 21/31 726/6 |
| 2009/0055648 A1* | 2/2009 | Kim ....................... H04L 63/06 713/171 |
| 2011/0055585 A1 | 3/2011 | Lee |
| 2011/0126024 A1* | 5/2011 | Beatson ................ G06F 21/32 713/186 |
| 2012/0054741 A1* | 3/2012 | Ali ....................... H04L 9/3231 718/1 |
| 2013/0074165 A1* | 3/2013 | Dhaene ................. G06F 21/34 726/5 |

FOREIGN PATENT DOCUMENTS

| | | |
|---|---|---|
| WO | 2007066203 A1 | 6/2007 |
| WO | 2009146655 A1 | 12/2009 |

OTHER PUBLICATIONS http://folk.ulo.no/josang/im: "Identity Management": Apr. 20, 2012.
Jan. 21, 2013—(GB) Search Report—App 1217084.1.
International Search Report dated Feb. 3, 2014 (PCT/EP2013/070022); ISA/EP.
User Centric Identity Management by Simon Pope and Audun Josang; AusCERT Conference, 2005.
Apr. 9, 2015—(PCT) IPRP—App. PCT/EP2013/070022—8 pages.

* cited by examiner

NETWORK SECURITY

CROSS REFERENCE TO RELATED APPLICATIONS

The present application is a U.S. National Phase of International Application No. PCT/EP2013/070022 filed on Sep. 25, 2013 and designating the United States of America. This application claims the benefit of the above-identified application which is incorporated by reference herein in its entirety.

The present invention relates to an apparatus and method for a user to authenticate himself when logging on to a computer, such as a remote server that is accessed via the Internet. In particular, the invention relates to the use of such a method and apparatus for digest access authentication.

The use of a username and password to log on to computer systems, whether local or remote, has become ubiquitous in the modern age. In basic access authentication, the username and password are sent in plain text, which is satisfactory for a secure system, but in the case of an insecure network there is a risk that the password could be intercepted and so protocols have been developed to overcome this problem. One well-known approach, which is widely used for access to web sites, is digest access authentication where a "digest", such as a hash function, of the password is transmitted over the network.

HTTP Digest Access Authentication is a 1997 web standard for authenticating a client to a server. Its intended use is on the World Wide Web, but it is perfectly implementable on local resources, or in any situation where resource access over HTTP should be restricted. Digest authentication was introduced as an extension to the former standard basic access authentication which, as noted above is considered insecure.

In practice, digest authentication is used to enforce an access control policy on a certain realm and the resources it contains. Each user must be registered with sufficient credentials (user name and password) at the system enforcing the realm's access control and be able to authenticate himself to the server using those registered credentials.

When a user attempts to access a particular realm, for example, http://example.com/secret/, the client's web browser (user agent) issues an HTTP GET http://example.com/secret/ request. The server then responds with a 401 Authorization Required status code, indicating to the user that this resource requires him to be authorized for access, and a www-authenticate header, containing information that can help the system calculate the correct response for the server. The web browser then prompts the user for user name and password. A combination of these credentials and information extracted from the incoming www-authenticate header are hashed and then passed to the server in an Authorization header appended to another HTTP GET request. The server receives the response value—a hash of the user's credentials and the name of the protection realm. As hashing algorithms are one-way functions, there is no way for an adversary to simply extract the passwords from the value. At the server side, the credentials that were stored locally at the time of registration are used to calculate another hash value by the same rules and algorithm as at the client side. If the server side calculation is equivalent to the one received from the client, the server can conclude that it is certain of the client's identity and validate it against the access policy. If the user is authenticated and authorized, the server responds with a 200 OK status code and the contents of the protected resource that the user requested.

In addition to cryptographic hash functions, several other security mechanisms were introduced with Digest Access Authentication. For example, the password hash could still be intercepted and used by a hacker to access the server. This is known as a replay attack. Countering replay attacks is done by introducing a "nonce" (number used only once) which is valid for only for one attempt at authenticating or for a very limited amount of time. The nonce value is created at the server as a challenge to the user and the user must respond with that value unchanged to pass the challenge.

Further details of Digest Access Authentication are provided in Annex 1.

Digest Access Authentication is reasonably secure, but it will be appreciated that its security depends upon the user's password remaining secret. However, it is well-known that users often use the same password for multiple systems, web sites, etc., write down their password where it may be discovered, and/or chose passwords which are easy to guess. Published lists of popular passwords include "password", "football", etc. and where a single password is used for multiple systems, discovery of that one password compromises the user at each of those systems.

Ideally, therefore, a given password would only be used for one purpose, would be difficult to guess and would never be written down. However, these requirements are not well-suited to the human brain. Users may be forced to use mixtures of upper and lower case letters, digits and other characters. However, random strings of characters that are harder to guess are equally hard to remember and this difficulty increases with the number of passwords that must be remembered. If such passwords are to be used, therefore, they have to be written down. This may not be a serious vulnerability in a private situation, but it increases the risk of espionage in a communal or commercial environment.

The problem of an individual being unable to remember multiple hard-to-guess passwords has been addressed by the provision of identity management locally, i.e. in the user's domain, where they may be stored.

For example, web browsers provide software-based password managers where credentials are stored locally on the browser and entered automatically or on request. However, although the passwords are stored in encrypted format, it is possible to decrypt them by means of a simple script without a key being needed, unless a master password is set. Thus, such locally stored credentials are vulnerable to attack by a trojan or other malware.

Another known approach is to store passwords locally in hardware such as a secure external device. *User Centric Identity Management* by Simon Pope and Audun Jøsang (AusCERT Conference 2005) describes the use of a Personal Authentication Device (PAD), a secure device external to the computer, such as a smart card or other portable device. The PAD is used as an identity management system to which the user authenticates once (with a PIN number, password or similar), and for one session, the user can authenticate to every supported service automatically using the PAD as his identity manager. This is done by secure transmission of credentials between the PAD and the server. The PAD may be connected to the server via client platform by a communication channel (e.g. wireless protocols like Bluetooth), or directly to the server via a secondary channel. In. *Identity Management* by Audun Jøsang (URL: http://folk.uio.no/josang/im/) a variant called the OffPAD is described, which is so-called because it is intended to be (mostly) off-line and therefore more secure.

According to a first aspect of the invention there is provided a method for enabling a user of a client computer to securely access a remote server via a network by authenticating the user, the method comprising: providing a portable apparatus to the user which may communicate with the client computer; storing on the portable apparatus user credentials required to enable the user to be authenticated at the server; performing an authentication protocol between the client and the server; wherein: the authentication protocol includes the transmission to the server of a digest based at least partially on the user credentials; and the user credentials are stored on the portable apparatus in the form of a digest.

Thus, by means of the invention, the user credentials, are never stored or transmitted in plain text. Those credentials may comprise the username, password of the user and realm of the server that is to be accessed.

The invention is applicable, in principle, to any network, but it will normally be applied to a public IP network, such as the Internet. Thus, the user of the client computer will typically be seeking to securely access a remote server over the Internet. Thus, the term "remote" will normally imply not just that the client and server are separate, but that they are geographically distant from each other and may typically be operated by unrelated parties. Thus, the remote server may be providing an on-line service, which might be information, commerce, entertainment, etc.

Although the invention is applicable to any suitable authentication protocol, such protocols usually involve a challenge from the server to which the client must respond. The protocol is preferably HTTP Digest Access Authentication because this is so widely employed, particularly in relation to the Internet where the invention is particularly useful. Thus, the digest of credentials is most preferably a hash (such as SHA-1 or MD-5) of a string comprising user name, password and server realm. e.g. the string is that conventionally referred to as A1 and its hash is that referred to as HA1—see Annex 1. That digest may then be used to generate a response, which is typically a further digest, using data from the challenge.

The data from the challenge may comprise the HTTP request method (e.g. GET) and the uniform resource indicator (URI) of the digest realm (e.g. /secret/). The string comprising these is known as A2 and its hash is HA2. The response may then be a hash of A1, A2 and a nonce, e.g. MD5(HA1:nonce:HA2). This allows backwards compatibility with the first specification of Digest Access Authentication. However, for higher quality of protection, the response hash is also based on a nonce counter (a number starting at 00000001), a client nonce, and/or a quality of protection (qop) value. The client nonce allows the client to validate the server relationship later and the qop value describes what level of protection should be met. Thus, the response may be MD5(HA1:nonce:nonceCount:clientNonce:qop:HA2) in line with the RFC 2617 standard.

The portable apparatus could be any apparatus capable of providing storage for the credentials, the necessary data processing capability and means to communicate with the client computer. As such, existing devices such as smartphones could be used. However, this is less preferred because the multiplicity of communication modes provided by such devices increase the number of routes by which a hacking attack may take place. A bespoke device is therefore to be preferred. Furthermore, the portable device preferably communicates with the client computer only to facilitate authentication of the user. As such, it is primarily off-line and may thus be a form of "OffPAD".

The OffPAD is preferably designed to have limited connectivity in order to reduce its vulnerability to attack and so it is offline as much as possible (hence its name). It should preferably only communicate in response to an authenticated request. Although any suitable wired or wireless connectivity may be used, the connectivity means is preferably near field communication (NFC) or other physically activated wireless communication. The device preferably has an infrastructure for secure messaging and storage, such as that described in ISO 7816-4.

Preferably, at least part of the challenge from the server is passed from the client to the portable apparatus so that the portable apparatus may generate all or part of the response. Thus, preferably, the portable apparatus determines the digest for transmission to the server from the digest of user credentials stored thereon and preferably also from the at least part of the challenge. Most preferably the response is as described above.

In a simple form of the invention, the portable apparatus may comprise a single set of credentials. This may be appropriate where the apparatus is to be supplied to a user by the operator of a particular server. This is likely to occur in situations where a high level of security is required, such as for financial transactions and the server operator wishes to ensure security at the client. In such a scenario, the apparatus may be provided via a secure delivery means and already comprise the user credentials, or part of them. However, it is generally envisaged that the invention will be used by a user to store sets of credentials for multiple servers (and/or multiple identities belonging to a single user), for example to enable access to multiple web sites to which the user subscribes—paywall news services, sites of membership organisations, shopping sites, etc. Since the portable apparatus stores the credentials, the user is not restricted to the use of memorable passwords and will not be tempted to use the same password for multiple servers. The password may be generated, saved to the portable apparatus and forgotten.

Even though the credentials are stored on the portable apparatus in the form of a digest, which makes recovery of the password itself impracticable, it is preferred that steps be taken to prevent unauthorised use of the apparatus and/or the digest itself. It is therefore preferred that the portable apparatus requires the input of a password or PIN, e.g. via text input means, or biometric identifier (fingerprint, iris scan, etc.) before the credentials may be used. Such an input may be required once per session (e.g. on powering up the apparatus) or each time an authentication is required. In most cases it will be sufficient to require this input before the apparatus can be activated, but if a still higher lever of security is required, the digest(s) of the credentials may be stored in encrypted form. The above-mentioned inputs or some other input, such as a master password, may be required to perform the decryption.

Preferably, the unique identifier corresponds to the identity of a portable device which communicates with the client computer to facilitate the authentication protocol. The digest is preferably provided to the portable device and stored thereon. The unique identifier may be transmitted to the server in encrypted form, preferably using a public key associated with the server.

As mentioned above, in certain forms of the invention, the password may be provided for the user. Indeed, in the preferred forms of the invention, the password of the user is generated at the server and the digest of the user credentials is generated therefrom at the server and communicated to the user.

For example, the OffPAD may first generate a random and preferably large password (e.g. 16 bytes or longer) and uses it to create automatically a credential set for the specified realm. This may also include a unique ID of the OffPAD, though the user could provide a username. Preferably the credential set automatically generated at the OffPAD is hashed, together with the realm using, for example, SHA-1 or MD5 to produce the HA1 of digest authentication. The HA1 value is stored locally and transmitted confidentially to the server for registration. The HA1 is linked to the username and realm and the system notifies the user of his authorization.

The digest of the users credentials may be transmitted securely to the portable device via the network, e.g. using symmetric or asymmetric encryption or the digest of the users credentials may be communicated to the user off-line, for example by post, courier or personal delivery. They may be communicated in written form, but it is preferred to use a smart card or other data carrier which may be read by the portable apparatus.

This arrangement is regarded as being inventive in itself and therefore, viewed from another aspect, the invention provides a method of generating and supplying to a client credentials for use in an authentication protocol to permit the user of a client computer access to a remote server, the method comprising: transmitting from the client to the server a unique identifier of the user; at the server, randomly generating a password for the user and based on that password generating a digest for use in the authentication protocol; and providing the digest to the user.

Preferably, the digest is also based on the unique identifier. For example, the unique identifier may be used as the "username" value during authentication. Additionally or alternatively, it may be used to calculate nonce and client nonce values.

The method preferably further comprises preferred features of the previously described aspect of the invention.

The invention also extends to a portable apparatus (e.g. an "OffPAD") for use in the above-described methods. Thus, viewed from a further aspect, the invention provides a portable apparatus for enabling a user of a client computer to securely access a remote server via a network by authenticating the user, the authentication protocol including the transmission from the client to the server of a response to a challenge by the server; wherein the portable apparatus comprises: means for communication with the client computer; and memory for storing in the form of a digest the user credentials required to enable the user to be authenticated at the server; the portable apparatus being configured to receive at least part of the challenge and to generate the response based on the digest of the user credentials.

The portable apparatus is preferably configured for use in the methods and preferred forms thereof described above.

The invention also extends to the portable apparatus in combination with a client computer with which it communicates, and also to a system comprising a server and the combination of client computer and portable device communicating therewith over the network.

From a further aspect, the invention extends to software comprising instructions to cause a computing apparatus to carry out the relevant parts of the methods described herein.

Certain embodiments of the invention will now be described, by way of example only, and with reference to the accompanying drawings, in which.

Figure 1:
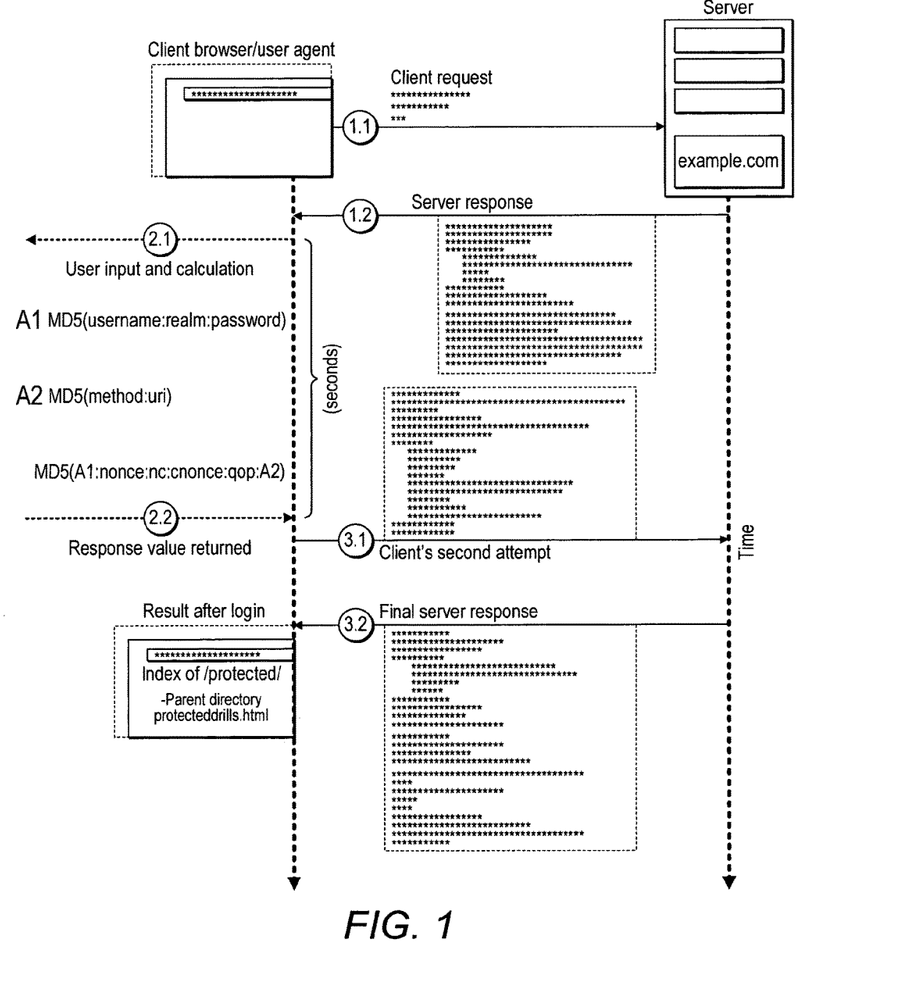
FIG. 1 is a diagram illustrating conventional HTTP Digest Access Authentication.

The conventional HTTP Digest Access Authentication protocol is known to those skilled in the art and is described in Annex 1 hereto, with reference to FIG. 1, for completeness. The embodiments of the invention that will be described with reference to the remaining figures employ a protocol that, when viewed from the server-side, is identical to the conventional protocol. However, the client-side is significantly modified and a new registration protocol is provided.

Figure 2:
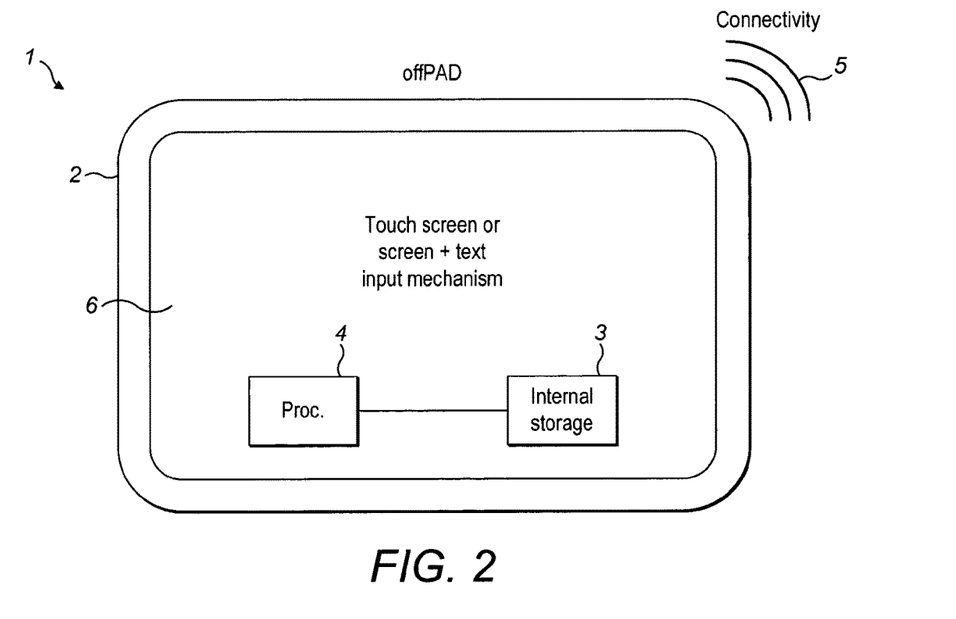
FIG. 2 is a schematic diagram of an OffPAD for use with embodiments of the invention.

FIG. 2 shows a portable apparatus 1 referred to herein as an "OffPAD". It comprises a secure housing 2 which encloses internal storage (solid state memory) 3, processor 4, connectivity means 5 and a touch screen (or screen and other text input means) 6.

The OffPAD is designed to have limited connectivity in order to reduce its vulnerability to attack and so it is offline as much as possible. It should only communicate in response to an authenticated request. The connectivity means 5 is NFC. The device has an infrastructure for secure messaging and storage such as that described in ISO 7816-4 and access control is provided by the requirement to enter a PIN code via text input means 6.

The internal storage contains software, i.e. applications required to operate the OffPAD, and data in the form of sets of credentials corresponding to identities that are used to identify the user of the OffPAD when he wishes to access a remote server using his client computer. The software may run passively, i.e. without user intervention, particularly where only a single or a small number of set(s) of credentials are to be stored by the OffPAD, or where no management or modification of credentials is needed.

The OffPAD communicates with the client using connectivity means 5 during digest authentication.

When digest authentication is done using the OffPAD, it handles part of the work conventionally done by the user client. Managing identities for multiple users at multiple realms it can either by itself, or by interaction with the user via the text input means 6, choose which identity to use. Authentication can be fully automated in situations where only one identity set is applicable, that is, only one user is registered for the realm in question. The identities are stored securely on the device. The authentication process will now be described with reference to FIG. 3. Here, the OffPAD 1 is shown in communication with the client computer 7 which in turn is connected to remote server 8.

Figure 3:
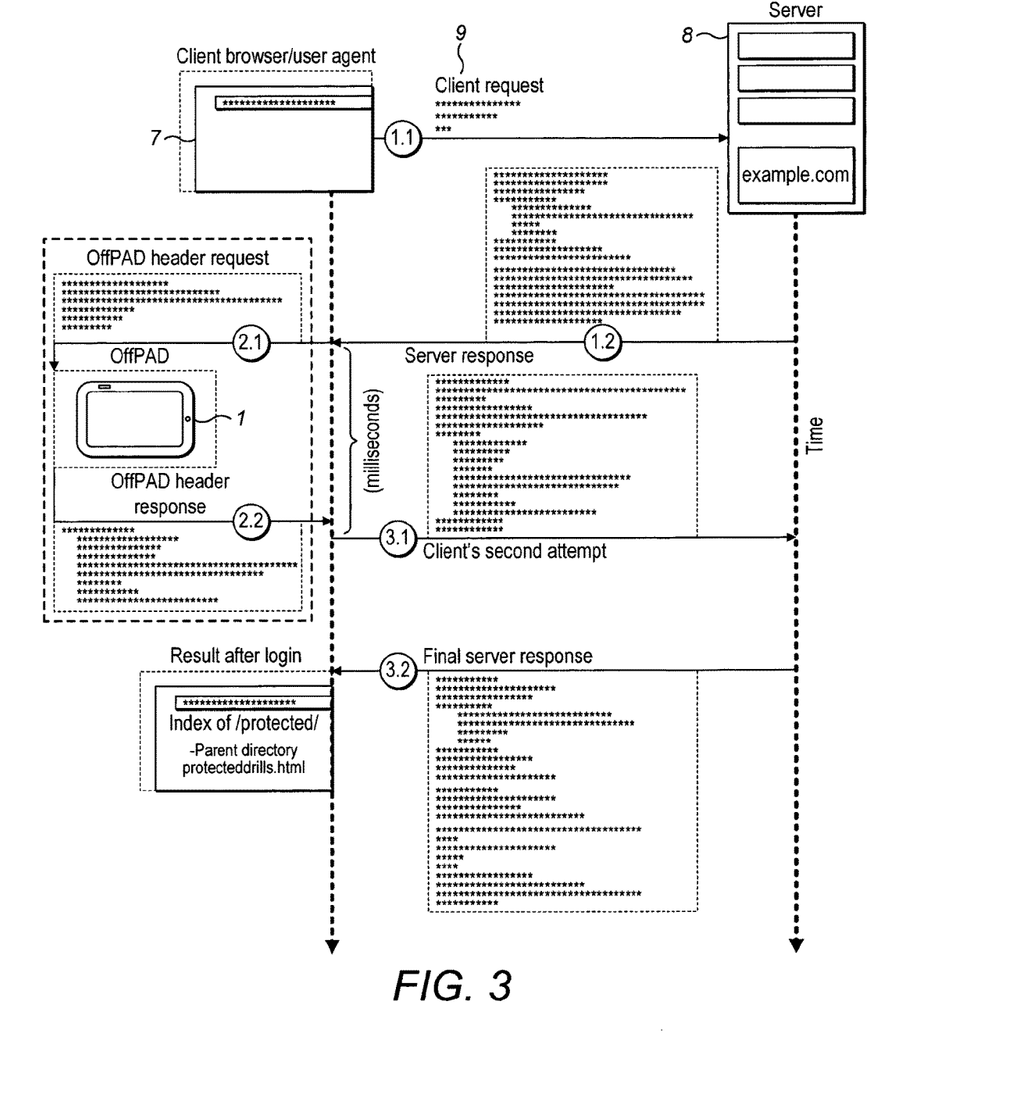
FIG. 3 is a diagram illustrating HTTP Digest Access Authentication in accordance with embodiments of the invention.

The user navigates to the server he wishes to access using the client computer which seeks to access a realm of server 8, by means of client request 9, which issues a challenge (authentication request) to the client in the conventional manner. This is routed to the OffPAD 1.

During the authentication phase, when calculating the response value for digest authentication, some of its contents are split in two separate calculations, HA1 and HA2. These calculations are in themselves conventional and are as described in Annex 1. HA1 is a digest (hash) of the relevant user credentials and the realm being accessed and therefore comprises both secret and static information. However, in the embodiment, HA1 is stored separately in storage 3 of the OffPAD. As such, the embodiment uses only that hash value, without ever exposing the secret credentials (e.g. the password) in clear text, in the process of response value calculation.

Access to the HA1 values of a user is done as follows: upon authorized request, the HA1 value in question is read from storage 3 on the OffPAD. The HA1 value is then used in the calculation of the response, together with the non-secret, dynamic HA2 whose contents are received from the server's request. Regardless of the age of HA1, a fresh response value may be calculated every time without having to store user credentials in plain text anywhere.

The server validates the response to the challenge in the conventional manner, authorising access if it is valid.

Although the embodiment may be used to access a server where a user has registered in the conventional manner, in which case the digest of A1 (i.e. HA1) is calculated locally, in a variant embodiment, HA1 is calculated at the server. This overcomes the problem that the registration phase is not intuitively secure.

To achieve this, the OffPAD first generates a random large password (e.g. 16 bytes) and uses it to create automatically a credential set for the specified realm. This may include a unique ID of the OffPAD 1, though the user could provide a username. Then, the user's identifier (username) is noted as authorized in the access policy of the system protecting the realm at the sever 8. To do this, the credential set automatically generated at the OffPAD is hashed, together with the realm using SHA-1 or MD5 to produce the HA1 of digest authentication. The HA1 value is stored locally and transmitted confidentially to the server for registration. The HA1 is linked to the username and realm and the system notifies the user of his authorization.

The registration phase in the original digest authentication scheme is done manually by pointing to a text document containing the authorized users in a list of the form username:realm:A1. If a higher authentication assurance level (AAL) is required, the credential set can be produced at the server side and securely transferred to the end user's OffPAD 1 out of band, e.g. using encrypted credentials on RFID (contactless) cards readable by the OffPAD.

ANNEX 1

HTTP Digest Access Authentication

HTTP Digest Access Authentication is a 1997 web standard for authenticating a client to a server. Its intended use is on the World Wide Web, but it is perfectly implementable on local resources, or in any situation where resource access over HTTP should be restricted. Digest authentication was introduced as an extension to the former standard basic access authentication which, as noted above is considered insecure.

In practice digest authentication is used to enforce an access control policy on a certain realm and the resources it contains. Authorized access to a realm protected by digest authentication requires each user to:

1) be registered with sufficient credentials (user name and password) at the system enforcing the realm's access control.

2) be able to authenticate himself to the server using the registered credentials.

To understand digest authentication, consider this scenario: The user wants to access some web resource at http://example.com/secret/. The /secret/ directory has been protected by its owner with digest authentication, so that only authorized users are approved access.

Trying to access http://example.com/secret/ initiates the following challenge/response communication between the user and server, over the HTTP protocol:

1) The client's web browser (user agent) issues a HTTP GET http://example.com/secret/

2) Server responds with a 401 Authorization Required status code, indicating to the user that this resource requires him to be authorized for access, and that he is currently not authenticated. Along with the status code, the server passes a www-authenticate header, containing information that can help the system calculate the correct response for the server.

3) The web browser interprets the 401 status code and prompts the user for user name and password.

4) A combination of the credentials and information extracted from the incoming www-authenticate header are hashed. They are then passed with another HTTP GET, now with an appended Authorization header, containing the response and other values.

5) The server receives the response value—a hash of the user's credentials and the name of the protection realm. As hashing algorithms are one-way functions, there is no way for an adversary to simply extract the passwords from the value. At the server side, the credentials that were stored locally at the time of registration are used to calculate another hash value by the same rules and algorithm as at the client side. If the server side calculation is equivalent to the one received from the client, the server can conclude that it is certain of the client's identity and validate it against the access policy. If the user is authenticated and authorized, the server responds with a 200 OK status code and the contents of the protected resource that the user requested. If not, he is presented another 401 Authorization Required, and given another try at authenticating.

In addition to cryptographic hash functions, several other security mechanisms were introduced with Digest Authentication. They are described in the following subsections.

A. Replay Attacks and the Nonce

Basic authentication's big flaw was that the password was minimally protected; in effect it could be read by anyone who knew what they were looking for. After decoding the password, the adversary would be in a position where he could be falsely authenticated at the remote server, and at any other location the victim had used that same password. Introducing hash functions, however, again only converts the password; though this time in an indecipherable manner. The adversary can no longer directly deduce the password from the source, but he is free to reuse the values he captures. Also, an exhaustive or dictionary attack on the retrieved password hash is possible. Below is an attack scenario using the first weakness on a form of Basic authentication that hashes the credentials instead of encoding them.

1) Alice (the client or victim) logs on to a remote server, and authenticates using her username Alice and the password Alice1234. This produces the following response value in the Authorization header:

MD5("Alice:Alice1234")=910997b86fbcb903 e6b38a015c90746d.

As it is clear to the server that she is in possession of the password, she is authorized, and logged in.

2) Harold (the hacker), who is tapping into the network traffic, collects Alice's MD5 hash. He then tries logging in at the same server as Alice with an erroneous password. This produces a different MD5 hash than above.

3) Before passing the erroneous hash to the server, he replaces the incorrect hash value with the one he captured from Alice earlier.

4) Harold has now falsely authenticated himself as Alice, and gains unauthorized access to Alice's resources.

This is known as a replay attack: the header is replayed to the server, who unwittingly identifies the login attempt as another one from Alice. As the password hash is the same, the perpetrator is approved access. Note that Alice has no way of noticing the attack, as she is experiencing a passive attack from the adversary, in which he only reads. Countering replay attacks is done by introducing another value into the communication: the nonce. By its name, the nonce value is a number used only once, only for one try at authenticating or a very limited amount of time. The nonce value is created at the server as a challenge to the user. If she is able to respond with the current nonce (and it has not yet been used), she passes the challenge. This way, executing a replay attack must be done before the actual response is sent from Alice.

This nonce calculation procedure is suggested in RFC2617:

time-stamp H(time-stamp ":" ETag ":" private-key)

Where H is some hash function (usually MD5), time-stamp is the current time at the server, ETag is a fingerprint value unique to the contents at the location and private-key is a value private to the server. These values are not thoughtlessly chosen. The time stamp separates the authentication tries from each other in time and the ETag is used to rule out cases where old nonces are reusable due to a site update. Finally, the private key is used for the server to ascertain that the integrity of the nonce does not change during transmission. Albeit a suggestion, the nonce calculation function above has become a de facto standard; all major web browsers seem to use the same function.

1) Client nonce: The client nonce is another nonce passed from the client to the server to get the same assurance in the other direction as well. It is used only in conjunction with the quality of protection (qop) directive. We describe this below.

B. Quality of Protection

Quality of Protection, defined in the qop field, describes what level of protection of the digest authentication scheme is used. It is initially sent from the server as an advertisement of available protection services. qop is defined for these values:

1) auth: Used to authenticate the user to the server with username and password.

2) auth-int: As above, with additional integrity protection: A hash of the entity body8 is hashed into the final response value.

Note that qop is not a requirement but a recommendation in Digest Authentication. RFC2617 is backwards compatible with the initial version, RFC2069.

C. Calculating the Response Value

The response value is calculated by the user as an answer to the server's authentication challenge (the www-Authenticate header). The value is the result of hashing two independent parts. The first, called HA1 is a hash of the realm and the user's credentials (i.e. A1) and the second, HA2, is a hash of time- and site-specific information (i.e. A2). Consequently, one can distinguish HA1 and HA2 as the secret and non-secret, or static and dynamic components of response respectively.

1) HA1: The contents of HA1 are dependent on the algorithm provided. If MD5 or no value is defined in the algorithm field, only the user credentials are used:

HA1=MD5(username:realm:password)

If the server requires HA1 to have time limited validity (algorithm=="MD5-sess" or similar), nonce and cnonce (client nonce) values are also applied:

HA1=MD5(MD5(username:realm:password):nonce: cnonce)

Notice that the MD5-sess response contains the default response value. The lifetime of the MD5-sess version of HA1 is dependent on the lifetime of the nonces, as these are wrapped in 2) HA2: When calculating the HA2 value, the qop field is taken into consideration. HA2 is defined for qop-values "auth" and "auth-int", and non-present qop for backwards compatibility with RFC2069. If qop=="auth" or nonpresent:

A2=MD5(method:uri)

Where method is the HTTP request method that was used. It can be any of the methods described in the HTTP standards, such as GET, POST, etc. All HTTP Request methods are defined in the HTTP 1.1 RFC[4]. If qop=="auth-int":

A2=MD5(method:uri:MD5(entity-body))

3) response: When both HA1 and HA2 have been calculated, the response value is finalized depending on whether qop is set: If qop is set (either qop=="auth" or qop=="authint")

response=MD5(A1:nonce:nc:cnonce:qop:A2)

Where nc is an eight digit nonce counter incrementing on every attempt. If qop is not set, the response value must be backwards compatible with RFC2069 using only the nonce value:

response=MD5(HA1:nonce:HA2)

The invention claimed is:

1. A method for enabling a user of a client computer to securely access a remote server via a network, which is preferably the Internet, by authenticating the user, the method comprising:

providing a client-side portable apparatus to the user which may communicate with the client computer, the portable apparatus comprising an input device, wherein the portable apparatus communicates with the client computer only in response to an authenticated request;

storing on the portable apparatus user credentials required to enable the user to be authenticated at the server;

communicating between the portable apparatus and the client computer over a communication channel selected from the group consisting of a near field communication (NFC) channel, a Bluetooth channel, and a wired communication channel;

performing an authentication protocol between the client and the server;

wherein:

the authentication protocol includes the transmission to the server of a digest based at least partially on the user credentials;

the user credentials are stored on the portable apparatus in the form of a digest; and the portable apparatus requires an input datum from the user of an identifier directly via the input device before the credentials can be used or modified.

2. A method as claimed in claim 1, wherein the credentials comprise the username, password of the user and realm of the server that is to be accessed.

3. A method as claimed in claim 1, wherein the protocol is HTTP Digest Access Authentication.

4. A method as claimed in claim 1, wherein the network is the Internet.

5. A method as claimed in claim 1, wherein the portable device communicates with the client computer only to facilitate authentication of the user.

6. A method as claimed in claim 1, wherein the digest is transmitted in response to a challenge from the server.

7. A method as claimed in claim 6, wherein at least part of the challenge from the server is passed via the client to the portable apparatus.

8. A method as claimed in claim 7, wherein the portable device determines the digest for transmission to the server from the digest of user credentials stored thereon and preferably also from the at least part of the challenge.

9. A method as claimed in claim 1, wherein the portable device holds a plurality of sets of user credentials corresponding to different identities and/or servers.

10. A method as claimed in claim 1, wherein the digest(s) of the credentials is/are stored in encrypted form.

11. A method as claimed in claim 1, wherein the portable apparatus requires the input provided by the user, wherein the input comprises at least one of a password, PIN and biometric identifier before the credentials may be used or modified.

12. A method as claimed in claim 1, wherein the password of the user is generated at the server and the digest of the users credentials is generated therefrom at the server and communicated to the user.

13. A method as claimed in claim 12, wherein the digest of the users credentials is transmitted securely to the portable device via the network.

14. A method as claimed in claim 12, wherein the digest of the users credentials is communicated to the user off-line.

15. A client-side portable apparatus for enabling a user of a client computer to securely access a remote server via a network, which is preferably the Internet, by authenticating the user, an authentication protocol including the transmission from the client to the server of a response to a challenge by the server;
wherein the portable apparatus comprises:
an input device;
means for communication with the client computer over a communication channel selected from the group consisting of a near field communication (NFC) channel, a Bluetooth channel, and a wired communication channel, wherein the portable apparatus communicates with the client computer only in response to an authenticated request; and
memory for storing in the form of a digest the user credentials required to enable the user to be authenticated at the server;
the portable apparatus being configured to receive at least part of the challenge and to generate the response based on the digest of the user credentials; and
the portable apparatus requires an input datum, directly through the input device, from the user of an identifier before the credentials can be used or modified.

16. A method as claimed in claim 1, wherein the input from the user is required each time an authentication is required.

17. A method of generating and supplying to a client credentials for use in an authentication protocol to permit a user of a client computer access to a remote server, the method comprising:
transmitting from the client to the server a unique identifier of the user;
at the server, randomly generating a password for the user and based on
that password generating a digest for use in the authentication protocol;
providing the digest to the user, wherein:
the digest is stored on a client-side portable apparatus;
the portable apparatus comprises an input device, wherein the portable apparatus communicates with the client computer over a communication channel selected from the group consisting of a near field communication (NFC) channel, a Bluetooth channel, and a wired communication channel only in response to an authenticated request; and
an input datum from the user of an identifier directly via the input device is required before the credentials can be used.

18. A method as claimed in claim 17, wherein the digest is also based on the unique identifier.

19. A method as claimed in claim 18, wherein the unique identifier is used as the "username" and/or is used to calculate nonce and/or client nonce values.

20. A method as claimed in claim 17, wherein the unique identifier corresponds to the identity of a portable device which communicates with the client computer to facilitate the authentication protocol.

21. A method as claimed in claim 20, wherein the digest is provided to the portable device and stored thereon.

22. A method as claimed in claim 17, wherein the unique identifier is transmitted to the server in encrypted form, preferably using a public key associated with the server.

23. A method as claimed in claim 1, wherein the input from the user is required once per session.

* * * * *